(12) United States Patent
Pisanelli

(10) Patent No.: US 12,642,339 B2
(45) Date of Patent: Jun. 2, 2026

(54) PET ACCESSORY DEVICE

(71) Applicant: Rocky Pisanelli, Moonee Ponds (AU)

(72) Inventor: Rocky Pisanelli, Moonee Ponds (AU)

(*) Notice: Subject to any disclaimer, the term of this patent is extended or adjusted under 35 U.S.C. 154(b) by 52 days.

(21) Appl. No.: 18/873,164

(22) PCT Filed: Jun. 21, 2023

(86) PCT No.: PCT/AU2023/050555
§ 371 (c)(1),
(2) Date: Dec. 9, 2024

(87) PCT Pub. No.: WO2024/000012
PCT Pub. Date: Jan. 4, 2024

(65) Prior Publication Data
US 2025/0311829 A1      Oct. 9, 2025

(30) Foreign Application Priority Data

| Jul. 1, 2022 | (AU) | 2022901864 |
| Jul. 5, 2022 | (AU) | 2022204802 |
| May 11, 2023 | (AU) | 2023202943 |

(51) Int. Cl.

| *A45D 24/38* | (2006.01) |
| *A01K 13/00* | (2006.01) |
| *A45D 24/02* | (2006.01) |
| *B65D 83/08* | (2006.01) |
| *B65F 1/00* | (2006.01) |
| *B65F 1/06* | (2006.01) |
| *E01H 1/12* | (2006.01) |

(52) U.S. Cl.
CPC ............ *A45D 24/38* (2013.01); *A01K 13/002* (2013.01); *A45D 24/02* (2013.01); *B65D 83/0805* (2013.01); *B65F 1/0006* (2013.01); *B65F 1/062* (2013.01); *B65F 2240/136* (2013.01); *E01H 2001/128* (2013.01)

(58) Field of Classification Search
CPC ...... A01K 13/002; A45D 24/38; A45D 24/02; A47G 19/06; B65D 51/32; B65D 51/246; B65D 77/245; B65D 83/0805; B65F 1/0006; B65F 1/062; B65F 2240/136
USPC ................. 119/867; 206/581; 215/390, 227, 215/DIG. 5; 220/735, 736, 756; 294/1.3; 401/123, 131; D30/158, 159, 161, 162
See application file for complete search history.

(56) References Cited

U.S. PATENT DOCUMENTS

| 2,744,649 A | * | 5/1956 | Smith | B65D 23/12 |
| | | | | 215/390 |
| 3,031,711 A | * | 5/1962 | Herman | A47L 23/05 |
| | | | | 401/139 |

(Continued)

OTHER PUBLICATIONS

International Search Report & Written Opinion dated Aug. 18, 2023 from PCT Application No. PCT/AU2023/050555 (11 pages).

(Continued)

*Primary Examiner* — Gideon R Weinerth

(74) *Attorney, Agent, or Firm* — INNOVATION CAPITAL LAW GROUP, LLP; Vic Lin

(57) ABSTRACT

A pet accessory device comprising a container and a separate elongate grooming pick. The pick comprises a shaft and a head at a distal end of the shaft. An external surface of the container defines a storage recess for the pick. The storage recess discreetly holds the grooming pick for easy removal when required for grooming.

26 Claims, 2 Drawing Sheets

(56) References Cited

U.S. PATENT DOCUMENTS

| | | | | |
|---|---|---|---|---|
| 4,232,785 | A | * | 11/1980 | Lucas .................... A45D 27/22 |
| | | | | 215/390 |
| 5,551,569 | A | | 9/1996 | Garvin-Mazzarisi |
| 6,076,717 | A | * | 6/2000 | Edwards ............. A01K 27/008 |
| | | | | 225/53 |
| D585,764 | S | * | 2/2009 | Jefferson, Jr. .................. D9/729 |
| D998,910 | S | * | 9/2023 | Jemail .......................... D30/158 |
| D1,050,631 | S | * | 11/2024 | Wei .............................. D30/159 |
| 2003/0209210 | A1 | | 11/2003 | Plante et al. |
| 2004/0090073 | A1 | * | 5/2004 | Edwards ................. A47L 13/52 |
| | | | | 294/1.3 |
| 2008/0044219 | A1 | * | 2/2008 | McKay ................... A47L 13/51 |
| | | | | 222/113 |
| 2015/0108016 | A1 | * | 4/2015 | Horn .................... B43K 23/001 |
| | | | | 220/735 |
| 2017/0233136 | A1 | * | 8/2017 | Cartledge .......... B65D 21/0228 |
| | | | | 222/130 |
| 2023/0242298 | A1 | * | 8/2023 | Zeitz ...................... B65D 51/28 |
| | | | | 119/161 |
| 2025/0289648 | A1 | * | 9/2025 | Morand ............. B65D 83/0805 |
| 2025/0311829 | A1 | * | 10/2025 | Pisanelli ............ A46B 15/0095 |
| 2025/0338823 | A1 | * | 11/2025 | Mondloch ............. A46B 17/06 |

OTHER PUBLICATIONS

Written Opinion of the International Preliminary Examining Authority dated Mar. 15, 2024 from PCT Application No. PCT/AU2023/050555 (5 pages).

* cited by examiner

PET ACCESSORY DEVICE

FIELD OF THE INVENTION

This invention relates generally to a type of pet accessory device configured for holding faeces collection bags and discreetly holding a grooming pick for easy removal when required for pet grooming, such as removing faeces or foreign objects from pet fur, especially at the anal region.

SUMMARY OF THE DISCLOSURE

There is provided herein a pet accessory device comprising a container and a separate elongate grooming pick.

The pick comprises a shaft and a head at a distal end of the shaft. An external surface of the container defines a storage recess for the pick.

The storage recess discreetly holds the grooming pick for easy removal when required for grooming.

The storage recess may define a shaft channel which extends across a lid and a base of the container so that the grooming pick can be the same length as the container. The lid may have a concavity exposing a proximal end of the shaft of the grooming pick to provide purchase for a finger to pull the grooming pick from the storage recess. The lid and the base may be designed so respective shaft portions thereof align when the lid and base connect.

The lid and the base may define a internal spindles which align when the lid is connected to the base to hold a roll of plastic bags which may be accessed through an aperture through a side of the base.

The head of the grooming pick may comprise sideways extending combs and/or a distal tooth for picking faeces and foreign objects. The combs may comprise fine and course teeth combs for different types of pet hair.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
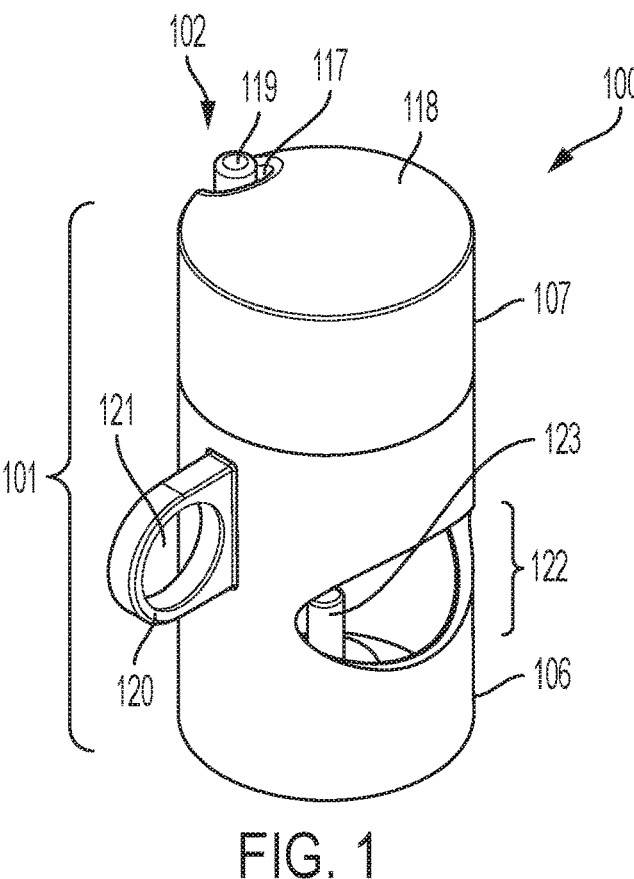
FIG. 1 shows a perspective view of a pet accessory device in accordance with an embodiment.
Figure 2:
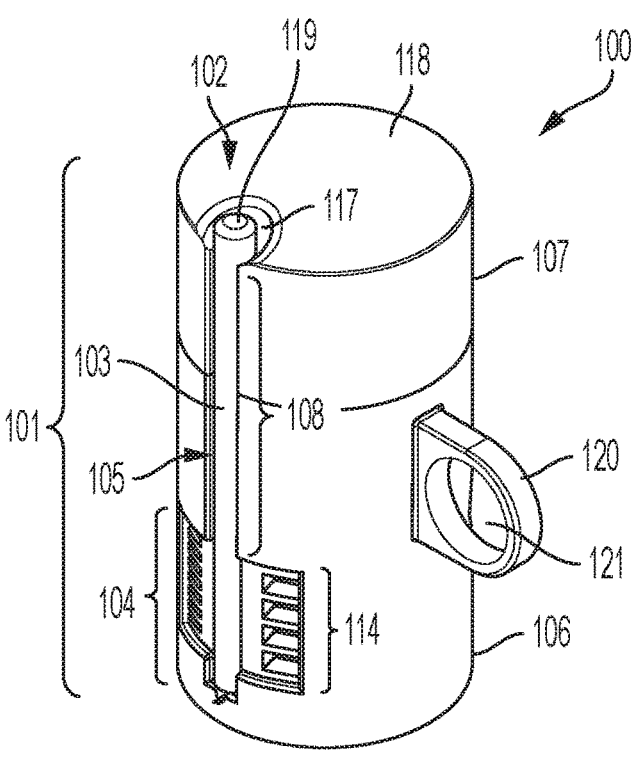
FIG. 2 shows an opposite side perspective view of the device.
Figures 3, 4, 5, 6, 7:
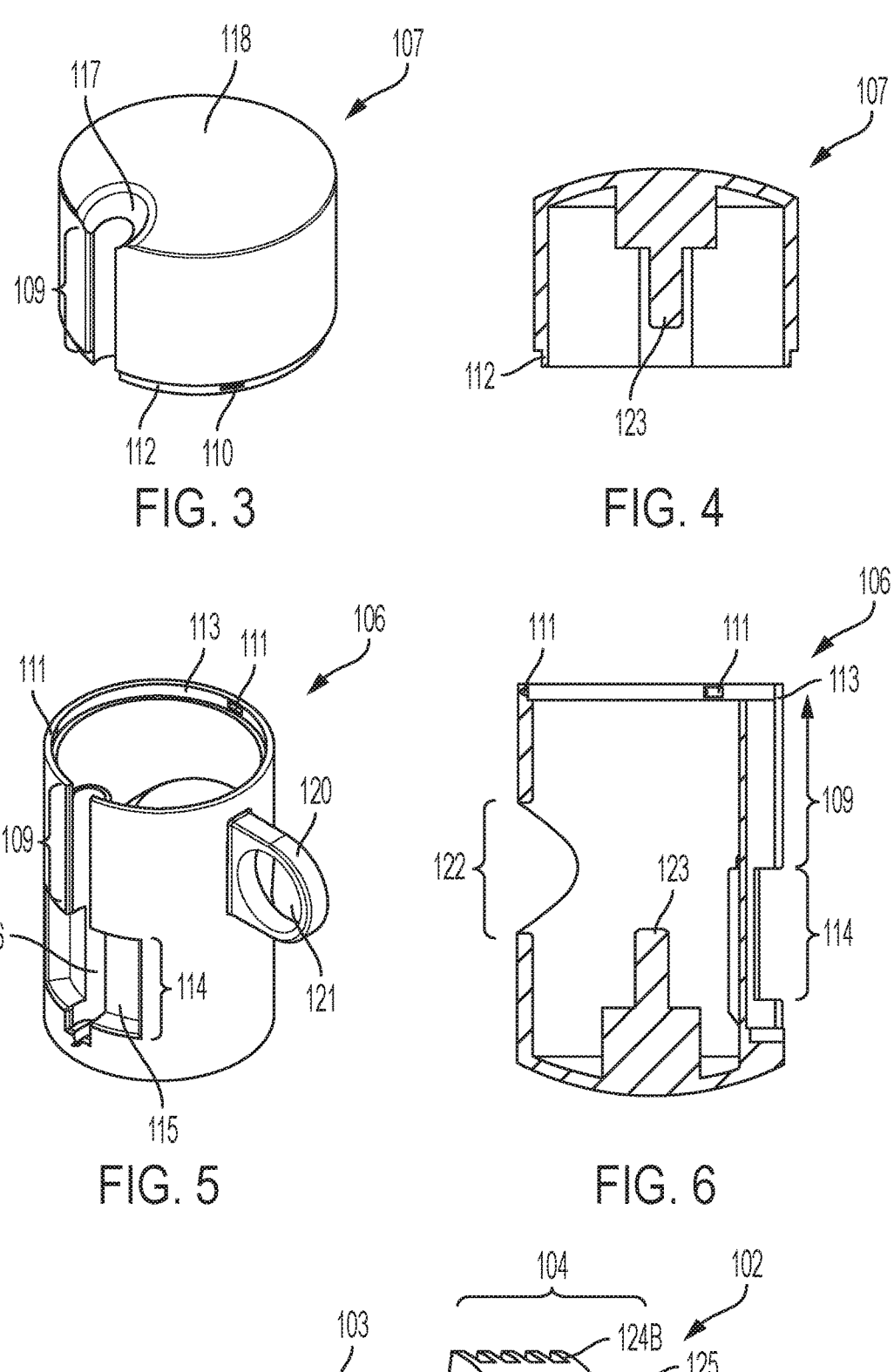
FIG. 3 shows a top perspective view of a lid of the device.
FIG. 4 shows a cross-sectional view of the lid.
FIG. 5 shows a perspective view of a base of the device.
FIG. 6 shows a cross-sectional view of the base.
FIG. 7 shows a grooming pick of the device.

FIGS. 1 and 2 show a pet accessory device 100 comprising a container 101 and a separate elongate grooming pick 102 shown in isolation in FIG. 7.

The pick 102 comprises a shaft 103 and a head 104 at a distal end of the shaft 102.

An external surface of the container 101 defines a storage recess 105 for the pick 102. The storage recess 105 is preferably open along the length of the container 101 so that the pick 102 can be pulled out from the storage recess 105 when required.

The pick 102 is preferably discreetly stored within the storage recess 105 so that the pick 102 does not protrude beyond a longitudinal cross-section of the container 101 when stored within the storage recess 105. According to the embodiment shown, the container 101 comprises a circular longitudinal cross-section and the recess 105 and the pick 102 is configured so that the pick 102 does not protrude beyond the circular longitudinal cross-section.

With reference to FIG. 2, the storage recess 105 may form a shaft channel 108 for storing the shaft 103. The container 101 may comprise a base 106 shown in isolation in FIG. 5 and a lid 107 shown in isolation in FIG. 3. The base 106 and the lid 107 may form shaft channel portions 109 which collocate when the lid 107 connects to the base 106 to form the shaft recess 108.

The lid 107 and the base 106 may be configured to connect to align the shaft channel portions 109.

According to the embodiment shown in FIGS. 3 and 5, the lid 107 and the base 106 may have a snap lock interface of rotationally collocating tabs 110 and recesses 111. These tabs 110 and recesses 111 rotationally collocate to ensure alignment of the shaft channel portions 109. Preferably, pairs of tabs 111 and recesses are not rotationally symmetric so that the tabs 110 and recesses 111 can only snap together in one rotational orientation to ensure alignment of the shaft channel portions 109.

The snap lock interface may comprise a lid 107 having a male rim 112 which inserts within a female rim 113. As is shown in FIG. 1, this interlock may provide the container 101 with a smooth exterior surface between the lid 107 and the base 106.

With reference to FIG. 3, the shaft channel 108 may widen to a head recess 114 for the head 104 of the grooming pick 102. With reference to FIG. 7, the head 104 may have curvature in longitudinal cross-section and, with reference to FIG. 5, the head recess 114 may have a conforming curved interior surface 115 so that the head 104 can lie flat against the surface 115. As is further shown in FIG. 5, the head recess 114 may define an internal channel 116 therealong which continues from the shaft recess 108 to accommodate a distal portion of the shaft 103.

With reference to FIG. 3, the shaft channel portion 109 of the lid 107 may terminate at a cavity 117 in a distal surface 118 of the lid 107. With reference to FIG. 2, a proximal end 119 of the shaft 103 preferably protrudes into the concavity 117. The proximal end 119 may be exposed in this way to provide purchase for a finger to pull the grooming pick 102 from the storage recess 105.

In this regard, a width of a gap formed by the shaft channel 108 may be configured to be slightly smaller than a width of the shaft 103 so that the shaft 103 is retained within the shaft channel 108 but can be pulled out through the gap formed by the shaft channel 108.

With reference to FIG. 2, the base 107 may define an external attachment formation 120 forming an aperture 121 therethrough for a clip, miniature carabiner or the like.

With reference to FIG. 1, the base 106 may define an aperture 122 into an interior of the container 101. The aperture 122 may be used for pulling plastic faeces collection bags from the container 101.

Preferably the aperture 122 has an ovular cross-section and wherein a major axis of the ovular cross-section is orthogonal with respect to a longitudinal axis of the container 101.

With reference to FIGS. 4 and 6, the base 106 and the lid 107 may comprise internal spindles 123 which align with the base 106 is connected to the lid 107 and which may define a gap therebetween. The roll of plastic bags may be engaged at opposite ends thereof by the spindles 123. Plastic bags may be pulled from the roll through the aperture 122.

With reference to FIG. 7, the head 104 preferably comprises at least one comb 124 which may be used to comb faeces or foreign objects (such as seeds, burs and the like) from pet fur, especially at the anal region.

The comb 124 may extend sideways from a distal portion of the shaft 103. Preferably the bank 102 comprises two combs 124 which extend sideways from both sides of the head 104.

The combs 124 may comprise a fine teeth comb 124A for fine pet fur and course teeth comb 124B for coarser pet fur. The fine teeth comb 124A may extend from one side of the head 104 whereas the course teeth comb 124B may extend from an opposite side of the head 104.

The combs 124 may have curvature in longitudinal cross-section as alluded to above so as to lie flat against the curved interior surface 115 of the head recess 114.

A distal end of the head 104 may comprise a tooth 125 which may be used for individually picking faeces or foreign objects. The tooth 125 may have curvature and may converge to a straight edge 126.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A pet accessory device comprising a container and a separate elongate grooming pick, the pick comprising a shaft and a head at a distal end of the shaft and wherein an external surface of the container defines a storage recess for the pick, and wherein the container comprises a base and a lid and wherein the storage recess forms a shaft channel for storing the shaft and wherein the base and the lid have collocating shaft channel portions.

2. The device as claimed in claim 1, wherein the storage recess is open so that the pick can be pulled out from the storage recess.

3. The device as claimed in claim 1, wherein the device is configured so that the pick does not protrude beyond a longitudinal cross-section of the container when stored within the storage recess.

4. The device as claimed in claim 1, wherein the base and the lid are configured to connect to align the shaft channel portions.

5. The device as claimed in claim 4, wherein the base and the lid have a snap lock interface of rotationally collocating tabs and recesses.

6. The device as claimed in claim 1, wherein the shaft channel of the base widens to a head recess for the head.

7. The device as claimed in claim 6, wherein the head has curvature in longitudinal cross-section and wherein the head recess has a conforming curved surface therein.

8. The device as claimed in claim 6, wherein the head recess defines an internal channel therealong which continues from a shaft recess to accommodate a distal portion of the shaft.

9. The device as claimed in claim 1, wherein the shaft channel portion of the lid terminates at a concavity in a distal surface of the lid.

10. The device as claimed in claim 9, wherein the device is configured so that a proximal end of the shaft protrudes into the concavity.

11. The device as claimed in claim 1, wherein the shaft channel is open and wherein a width of a gap formed thereby is configured to be slightly smaller than the width of the shaft so that the shaft can be pulled out from the channel through the gap.

12. The device as claimed in claim 1, wherein the base defines an external attachment formation having an aperture therethrough.

13. The device as claimed in claim 1, wherein the base defines an aperture into an interior of the container.

14. The device as claimed in claim 13, wherein the aperture has an ovular cross-section and wherein a major axis of the ovular cross-section is orthogonal with respect to a longitudinal axis of the container.

15. The device as claimed in claim 1, wherein the base and the lid comprise internal spindles which align when the base is connected to the lid.

16. The device as claimed in claim 15, wherein the spindles define a gap therebetween when the base is connected to the lid.

17. The device as claimed in claim 16, further comprising a roll of plastic bags engaged at opposite ends by the spindles.

18. The device as claimed in claim 17, wherein the base defines an aperture into an interior of the container between the spindles to access the roll.

19. The device as claimed in claim 1, wherein the head comprises a comb.

20. The device as claimed in claim 19, wherein the comb extends sideways from a distal portion of the shaft.

21. The device as claimed in claim 20, wherein the head comprises combs which extend from both sides of the head.

22. The device as claimed in claim 21, wherein the combs comprise fine teeth and course teeth combs.

23. The device as claimed in claim 21, wherein the combs have curvature in longitudinal cross-section.

24. The device as claimed in claim 1, wherein a distal end of the head comprises a tooth.

25. The device as claimed in claim 24, wherein the tooth has curvature.

26. The device as claimed in claim 25, wherein the tooth converges to a straight edge.

* * * * *